United States Patent
Yokoyama (12)

(10) Patent No.: US 6,392,698 B1
(45) Date of Patent: May 21, 2002

(54) CAMERA HEAD-DETACHABLE IMAGE SENSING APPARATUS, IMAGE PROCESSING APPARATUS, AND IMAGE SENSING SYSTEM CONSTITUTED THEREWITH

(75) Inventor: Toshihiko Yokoyama, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/984,943

(22) Filed: Dec. 4, 1997

(30) Foreign Application Priority Data

Dec. 6, 1996 (JP) ............................................. 8-327250
Dec. 6, 1996 (JP) ............................................. 8-327251

(51) Int. Cl.[7] ............................ H04N 7/18; H04N 5/232
(52) U.S. Cl. ........................ 348/222; 348/143; 348/212
(58) Field of Search ................................ 348/207, 211, 348/212, 213, 143, 65, 72, 73, 335, 222, 71; 358/909.01

(56) References Cited

U.S. PATENT DOCUMENTS 5,486,853 A * 1/1996 Baxter et al. ................ 348/222
5,978,651 A * 11/1999 Eto et al. ..................... 348/143

OTHER PUBLICATIONS

U.S. application No. 08/893,239, filed Jul. 15, 1997, pending.
U.S. application No. 08/842,394, filed Apr. 23,1997, pending.

* cited by examiner

Primary Examiner—Wendy R. Garber
Assistant Examiner—Rashawn N. Tillery
(74) Attorney, Agent, or Firm—Morgan & Finnegan, LLP (57) ABSTRACT

An image sensing system configured with a camera head-detachable image sensing apparatus and an image processing apparatus connected via a cable. The image processing apparatus generates a reference clock signal, and transmits it to the image sensing apparatus via the cable. The image sensing apparatus generates horizontal and vertical synchronizing signals on the basis of the received reference clock signal, and transmits the generated synchronizing signals to the image processing apparatus as a composite synchronizing signal. The image processing apparatus separates the composite synchronizing signal into the vertical and horizontal synchronizing signals, then transmits a control signal for controlling the image sensing apparatus during the vertical blanking period. The horizontal and vertical synchronizing signals are also provided to a VIDS circuit of the image sensing apparatus, and the control signal is multiplexed to an image signal during a vertical blanking period by the VIDS circuit and an adder. The image processing system separates the control signal from the inputted image signal and performs corresponding processes on the respective separated signal.

20 Claims, 7 Drawing Sheets

CAMERA HEAD-DETACHABLE IMAGE SENSING APPARATUS, IMAGE PROCESSING APPARATUS, AND IMAGE SENSING SYSTEM CONSTITUTED THEREWITH

BACKGROUND OF THE INVENTION

The present invention relates to a camera head-detachable image sensing apparatus, an image processing apparatus, and an image sensing system constituted therewith and, more particularly, to an image sensing apparatus and an image processing apparatus, connected to each other via a cable, and an image sensing system.

A variety of image sensing systems, so-called head-detachable cameras, using a solid-state image sensing device, such as a charge-coupled device (CCD), have been proposed. In such systems, an image sensing unit (camera head) and a signal processing unit for processing signals from the image sensing unit and outputting as video signals are separately configured, and connected with a cable.

Further, an image sensing apparatus using CCD has been down-sized and down-weighed, and a variety of methods for processing image signals, obtained from a CCD, in digital form by using high-speed analog-digital (A/D) and digital-analog (D/A) converters, realized in the progress of semiconductor manufacturing technique, have been proposed.

Furthermore, as personal computers have been popularized, application of head-detachable cameras to a desk-top television conference system using the personal computers has been proposed.

Figure 7:
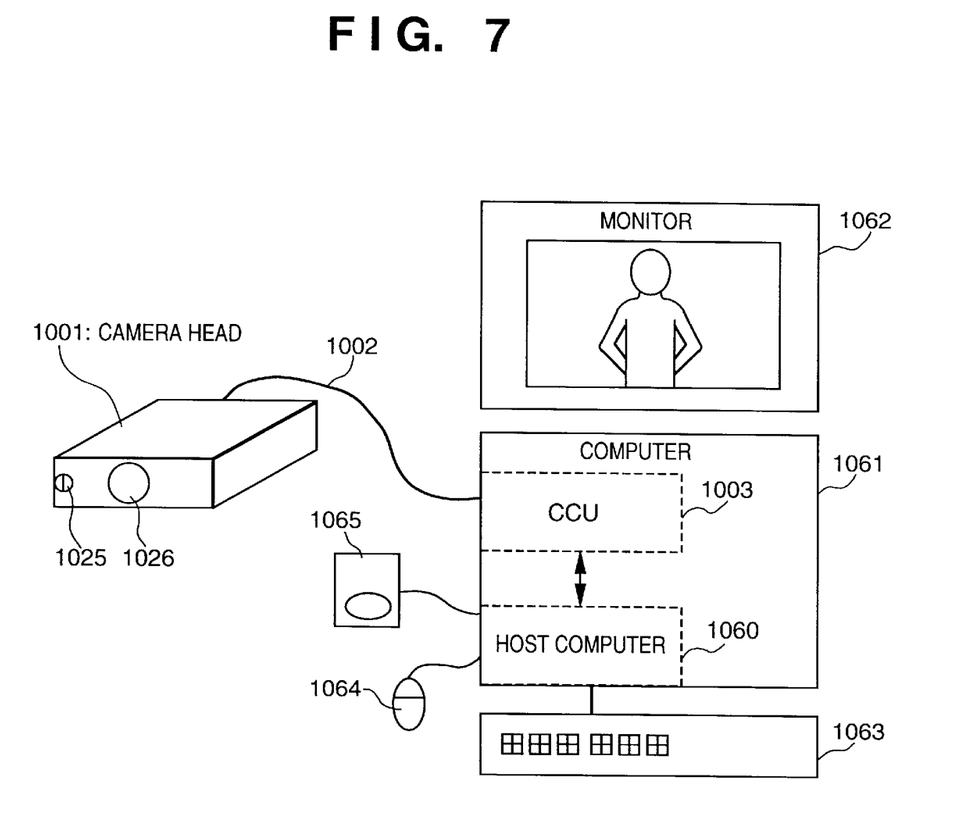
FIG. 7 is an explanatory view showing an example of a desk-top television conference system using a head-detachable camera.

As shown in FIG. 7, an example of a desk-top television conference system mainly configured with a camera head 1001, stereo microphones 1025 and 1026, a cable 1002, a camera control unit (CCU) 1003 provided in an expansion board for performing signal processes and controlling compression and expansion of input image and audio data, a host computer 1060, a host computer unit 1061 including the CCU 1003 and the host computer 1060, a keyboard 1063, a mouse 1064, a speaker 1065, and a monitor 1062.

Figure 8:
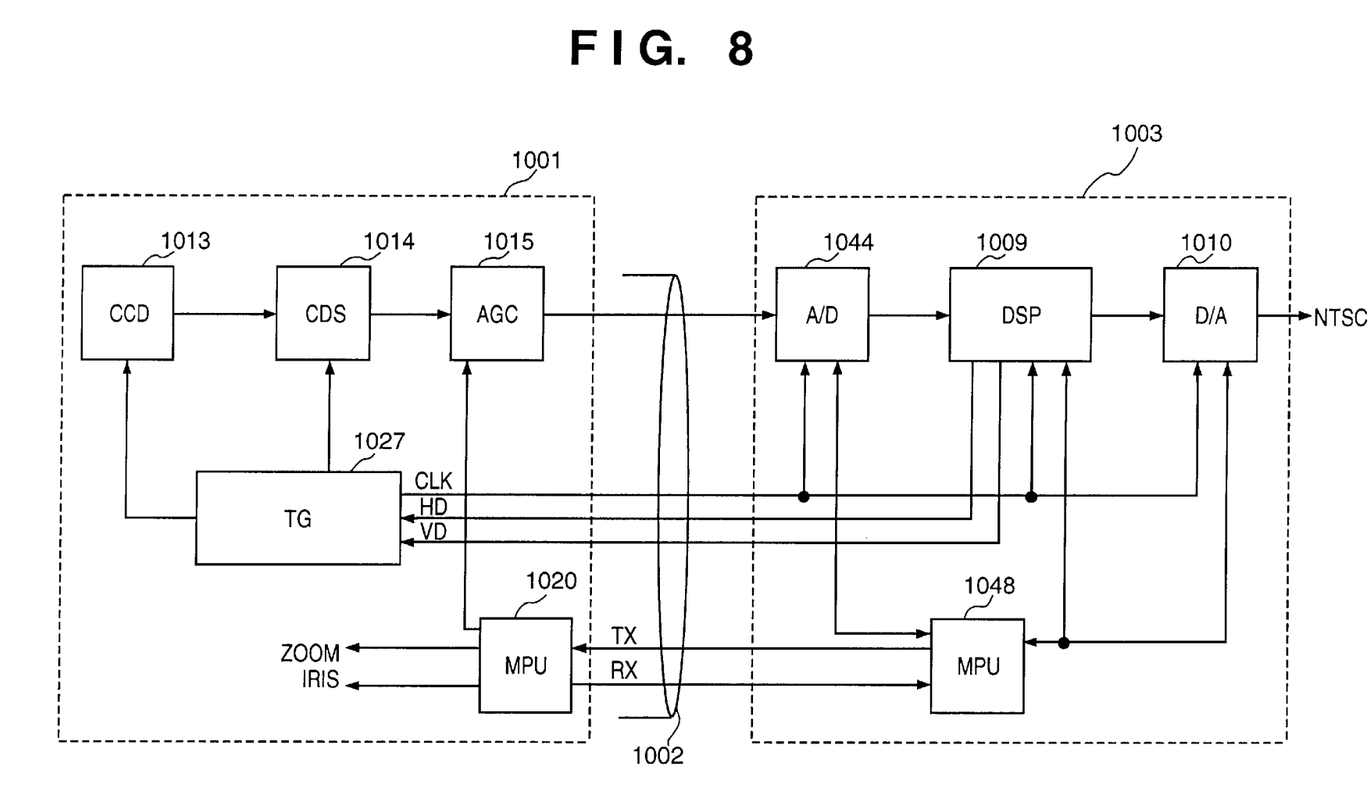
FIG. 8 is a block diagram illustrating a configuration of a conventional image sensing system.

FIG. 8 is a block diagram illustrating an internal configuration of a conventional image sensing system. In FIG. 8, reference numeral 1013 denotes a CCD; 1014, a correlated double sampling (CDS) circuit for performing correlated double sampling processing on an output signal from the CCD 1013 (CCD signal); 1015, an automatic gain controller (AGC) for controlling amplification of the CCD signal; 1027, a timing signal generator (TG) for generating timing signals necessary operating the CCD 1013, the CDS circuit 1014, and so on; and 1020, a microprocessor (MPU) for controlling each unit of the camera head 1001. The camera head 1001 having the units as described above is connected to the CCU 1003 via the cable 1002.

Further, reference numeral 1044 denotes an analog-digital (A/D) converter; 1009, a digital signal processor (DSP); 1010, a digital-analog (D/A) converter; and 1048, a microprocessor (MPU) for controlling each unit of the CCU 1003.

With the aforesaid configuration, a CCD signal and a clock signal (CLK) which is synchronized with the CCD signal, as well as a communication signal RX used for a communication between the MPU 1020 are the MPU 1048 are transmitted from the camera head 1001 to the CCU 1003 via the cable 1002. Further, a horizontal synchronizing signal (HD) and a vertical synchronizing signal (VD) used for establishing synchronization between the CCD 1013 and the DSP 1009, as well as a communication signal TX used for a communication between the MPU 1020 and the MPU 1048 are transmitted from the CCU 1003 to the camera head 1001.

The TG 1027 establishes horizontal synchronization between the DSP 1009 and the CCD 1013 in accordance with the HD signal, and also establishes vertical synchronization between the DSP 1009 and the CCD 1013 in accordance with the VD signal.

Further, the MPU 1048 communicates with the MPU 1020 using the communication signals TX and RX, and controls the AGC 1015 to adjust the gain for a CCD signal, and also controls an iris diaphragm and a zoom lens (not shown) of the camera head 1001.

The CCD signal is converted into digital signals by the A/D converter 1044 in synchronization with the clock signal CLK, applied with digital processes, such as filtering, color separation, $\gamma$ correction, matrix operation and clipping, which are necessary for color image signals by the DSP 1009. Thereafter, the processed signal is digital-analog converted by the D/A converter 1010, and outputted as a signal conforming to NTSC format (video signals). Regarding sound, microphones and audio cables are necessary besides the configuration as described above.

In the aforesaid example, however, there is a problem in which many signals, such as CCD signals, and the HD signal, the VD signal and the clock signal for synchronization, and the communication signals TX and RX, have to be interchanged between the camera head 1001 and the signal processing unit 1003. As a result, signal lines for transmitting and receiving these signals are necessary, which requires many components for signal transmission and reception, and prevent cost and size of the image sensing system from being reduced.

Further, there is a problem in which, when the length of the cable 1002 is changed, because of signal delay, the HD signal and the clock signal CLK may become out of synchronization. Furthermore, when a single CCD, each of whose pixels contributes different color component from color components contributed by the neighboring pixels, outputs a color CCD signal, if timing for outputting the color CCD signal and timing for processing the color CCD signal by a digital signal processor are out of phase by one pixel period, a signal of inverted color is outputted. For example, a cyan-and-green signal is processed in the manner for processing a yellow-and-magenta signal, and vice versa.

SUMMARY OF THE INVENTION

The present invention has been made in consideration of the above situation, and has as its object to provide a camera head-detachable image sensing apparatus, an image processing apparatus, and an image sensing system constituted therewith, capable of reducing the number of signal lines between the camera head and the CCU.

According to the present invention, the foregoing first object is attained by providing an image sensing system which includes: (1) an image sensing apparatus comprising: image sensing means for sensing an object and outputting an image signal; first input means for inputting a reference clock signal from an image processing apparatus; first synchronizing signal generation means for generating a plurality of synchronizing signals on the basis of the reference clock signal input from the image processing apparatus and generating a composite synchronizing signal by multiplexing the generated synchronizing signals; first output means for outputting the composite synchronizing signal generated by the first synchronizing signal generation means to the image processing apparatus; time-divisional multiplexing means for multiplexing first control data on the image signal in a time-division manner on the basis of the synchronizing signals generated by the first synchronizing signal generation means; second output means for outputting the image signal and the first control data which are multiplexed in the time-division manner by the time-divisional multiplexing means to the image processing apparatus; and second input means for inputting second control data from the image processing apparatus; (2) the image processing apparatus comprising: third input means for inputting the composite synchronizing signal from the image sensing apparatus; second synchronizing signal means for separating the composite synchronizing signal inputted by the third input means into a plurality of synchronizing signals and outputting the synchronizing signals; third output means for outputting the second control data to the image sensing apparatus on the basis of the plurality of synchronizing signals generated by the second synchronizing signal generation means; clock signal generation means for generating the reference clock signal; fourth output means for outputting the clock signal generated by the clock signal generation means to the image sensing apparatus; and fourth input means for inputting the image signal on which the first control data is multiplexed from the image sensing apparatus; and (3) a cable for connecting between the image sensing apparatus and the image processing apparatus, wherein the cable connects the first input means, the second input means, the first output means and the second output means of the image sensing apparatus to the fourth output means, the third output means, the third input means and the fourth input means of the image processing apparatus, respectively.

It is another object of the present invention to provide a camera head-detachable image sensing apparatus, an image processing apparatus, and an image sensing system constituted therewith, capable of reducing the number of signal lines between the camera head and the CCU, in which synchronization between the camera head-detachable image sensing apparatus and the image processing apparatus is not dissolved and inversion of color signals do not occur even when the length of a cable connecting between them is changed, since the change in the length does not cause the signal delay.

According to the present invention, the foregoing object is attained by providing an image sensing system which includes: (1) an image sensing apparatus comprising: image sensing means for sensing an object and outputting an image signal; clock signal generation means for generating a reference clock signal; first output means for outputting the clock signal generated by the clock signal generation means to an image processing apparatus; first synchronizing signal generation means for generating a plurality of synchronizing signals on the basis of the reference clock signal generated by the clock signal generation means and generating a composite synchronizing signal by multiplexing the generated synchronizing signals; second output means for outputting the composite synchronizing signal generated by the first synchronizing signal generation means to the image processing apparatus; time-divisional multiplexing means for multiplexing first control data on the image signal in a time-division manner on the basis of the synchronizing signals generated by the first synchronizing signal generation means; third output means for outputting the image signal and the first control data which are multiplexed in the time-division manner by the time-divisional multiplexing means to the image processing apparatus; and first input means for inputting second control data from the image processing apparatus; (2) the image processing apparatus comprising: second input means for inputting the composite synchronizing signal from the image sensing apparatus; second synchronizing signal generation means for separating the composite synchronizing signal inputted by the second input means into a plurality of synchronizing signals and outputting the synchronizing signals; fourth output means for outputting the second control data to the image sensing apparatus on the basis of the plurality of synchronizing signals generated by the second synchronizing signal generation means; third input means for inputting the reference clock signal from the image sensing apparatus; and fourth input means for inputting the image signal on which the first control data is multiplexed from the image sensing apparatus; and (3) a cable for connecting between the image sensing apparatus and the image processing apparatus, wherein the cable connects the first input means, the first output means, the second output means and the third output means of the image sensing apparatus to the fourth output means, the third input means, the second input means and the fourth input means of the image processing apparatus, respectively.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
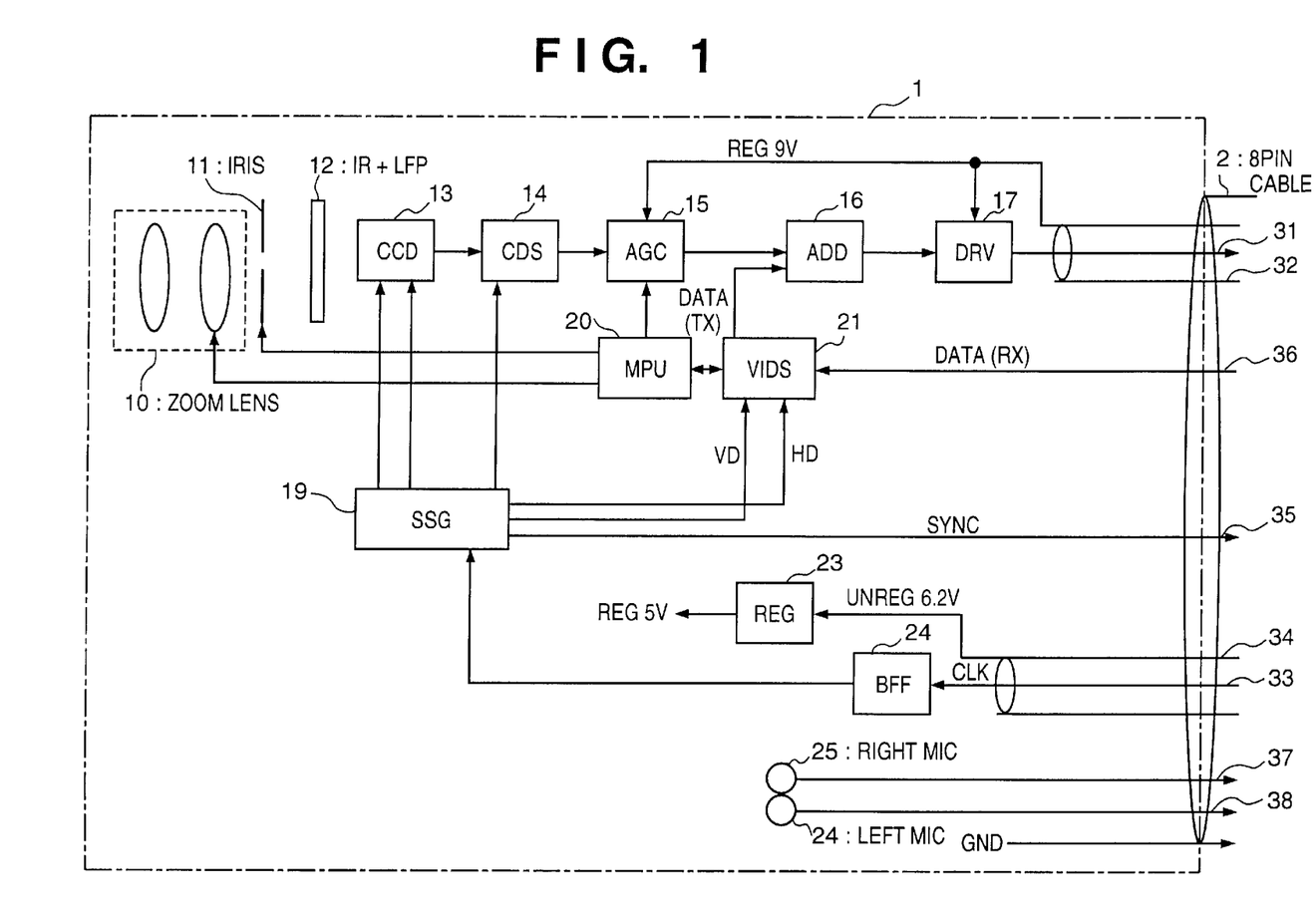
FIG. 1 is a block diagram illustrating a configuration of a camera head according to a first embodiment of the present invention.

FIG. 1 is a block diagram illustrating a configuration of a camera head 1 according to a first embodiment of the present invention. The camera head 1 includes: a zoom lens 10; an iris diaphragm 11; an optical low-pass filter and an infrared insulating filter 12; a charge coupled device (CCD) 13; a correlated double sampling (CDS) circuit 14; an automatic gain controller (AGC) 15; an adder 16 for adding the signal from the CCD 13 (referred to as "CCD signal" hereinafter) and control data TX, including information on, e.g., zooming, exposure and gain, which is inputted by a microprocessor (MPU) 20 via a vertical interval data signal (VIDS) circuit 21; a driving circuit 17 for driving a coaxial cable 31 and 32 of 75 ohms; a synchronizing signal generator (SSG) 19 for generating a horizontal synchronizing (HD) signal and a vertical synchronizing (VD) signal, further multiplexing the generated HD and VD signals to generate a composite synchronizing (SYNC) signal and outputting the SYN signal; the MPU 20 for controlling the overall operation of the camera head 1; the VIDS circuit 21 for transferring the control data TX, inputted from the MPU 20, to the adder 16 during a vertical blanking period and receiving control data RX which will be explained later; a series regulator (REG) 23 for generating electric power of 5V with little noise from electric power of 6.2V; a buffer circuit 24 for shaping the waveform of a clock (CLK) signal transmitted via a coaxial cable 33 and 34; a right stereo microphone 25; and a left stereo microphone 26.

Figure 2:
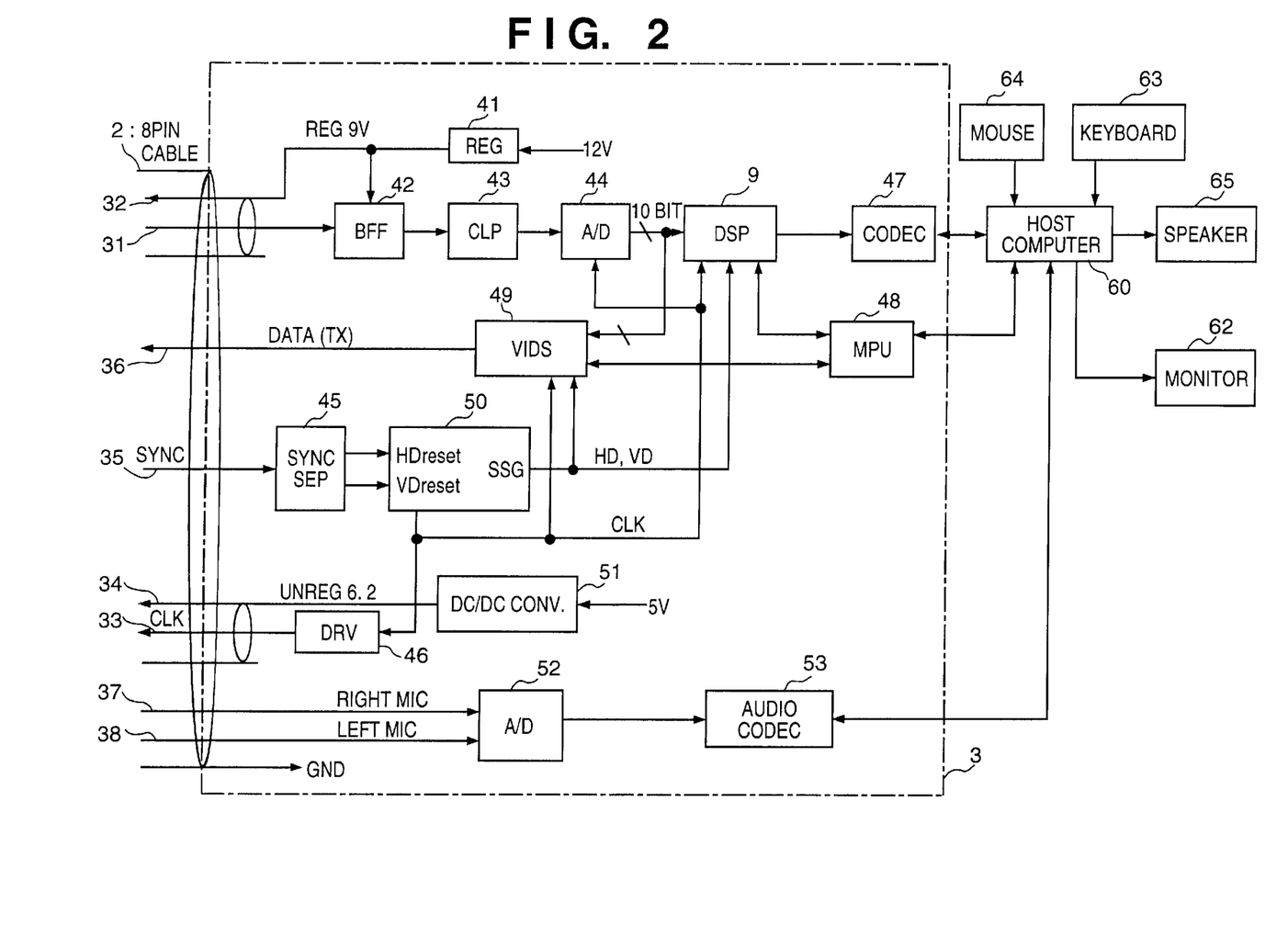
FIG. 2 is a block diagram illustrating a configuration of a camera control unit according to the first embodiment of the present invention.

FIG. 2 is a block diagram illustrating a of a camera control unit (CCU) 3 included in an expansion board (connected to an external bus of a personal computer, for example) according to the first embodiment of the present invention. The CCD 3 includes: a buffer circuit 42 for an image signal transmitted via the signal line 31; a clamp circuit 43; an analog-digital (A/D) converter 44; a digital signal processor (DSP) 9 for performing digital signal processes, such as filtering, color separation, γ correction, matrix conversion, and clipping, which are necessary for color image signals; an image codec 47 for converting into image data; a microprocessor (MPU) 48 for controlling overall operation of the CCU 3; a VIDS circuit 49 for detecting control data transmitted from the camera head 1 via the signal line 31 during the vertical blanking period and transmitting control data (TX) on, e.g., gain, exposure and zooming magnification to the camera head 1 during the vertical blanking period; a synchronizing signal generator (SSG) 50; a DC/DC converter 51; an analog-digital (A/D) converter 52; and an audio codec 53 for converting into audio data.

The VIDS circuit 49 detects the control data, transmitted from the camera head 1, multiplexed during the vertical blanking period of the CCD signal by comparing digital data obtained by performing analog-digital conversion on the composite signal transmitted from the camera head 1 via the signal line 31 with a predetermined reference digital value. The camera head 1 and the CCU 3 are connected via a cable 2.

In the aforesaid configuration, a SYNC signal transmitted via the signal line 35 from the camera head 1 is separated into a HD signal and a VD signal by a synchronizing signal separator 45. Thereafter, the separated HD and VD signals are inputted to the SSG 50 which generates various synchronizing signals in synchronization with the HD and VD signals. More specifically, the CCU 3 is horizontally synchronized with the camera head 1 by inputting the HD signal into a reset terminal of a horizontal synchronizing counter of the SSG 50. Similarly, the CCU 3 is vertically synchronized with the camera head 1 by inputting the VD signal into a reset terminal of a vertical synchronizing counter of the SSG 50.

The DC/DC converter 51 generates an output voltage of 6.2V from electric power of 5V to supply power to the camera head 1, including many noises, for a digital integrated circuit.

Signals inputted by the stereo microphones 25 and 26 via signal lines 37 and 38 are converted into digital signals by the A/D converter 52, then further converted into audio signals by the audio codec 53. Further, the image codec 47, the audio codec 53 and the MPU 48 exchange data with a host computer 60 via communication.

To the host computer 60, a keyboard 63, a mouse 64, a speaker 65 and a monitor 62 are connected.

A reference clock (CLK) is generated by the synchronizing signal generator 50, and transmitted to the VIDS circuit 49, the A/D converter 44, the DSP 9, and a driving circuit 46 for driving the coaxial cable 33 and 34. Further, the reference CLK outputted via the signal line 33 is transmitted to the camera head 1 via the driving circuit 46.

The MPU 20 of the camera head 1 communicates with the MPU 48 of the CCU 3 by exchanging control data (TX and RX), adjusts the gain for a CCD signal by controlling the AGC 15, adjusts the quantity of light by controlling the iris diaphragm 11, and controls the zooming magnification by controlling the zoom lens 10 on the basis of the control data (RX) transmitted from the CCD 3.

Further, the communication of the control data is performed using the VIDS circuit 21 of the camera head 1 and the VIDS circuit 49 of the CCU 3 included in the expansion board. Since the communication is performed by exchanging data during outside of an effective period of an image signal, namely, a vertical blanking period, the control data does not affect the image signal with a cross-talk noise.

The control data is multiplexed with the CCD signal during the vertical blanking period of the CCD signal (composite CCD signal), more specifically, in a period corresponding to three to four horizontal-line-period during the vertical blanking period, the control data is multiplexed, then the composite CCD signal is transmitted from the camera head 1 to the CCU 3. As for the control data transmitted in the opposite direction, it is directly transmitted from the CCU 3 to the camera head 1 via the signal line 36 during the vertical blanking period.

In the CPU 3 on the expansion board, the composite CCD signal transmitted via the signal line 31 is received and analog-signal converted by the A/D converter 44. Thereafter, the control data is extracted by the VIDS circuit 49 from the composite CCD signal in a form of ten-bit digital data converted by the A/D converter 44, by comparing the digital composite CCD signal to a reference digital value, then transmitted to the MPU 48. Meanwhile, in the CCU 3, the composite CCD signal, converted into a digital signal by the A/D converter 44 in synchronization with the CLK signal, is processed with digital signal processes, such as filtering, color separation, γ correction, matrix conversion, and clipping, which are necessary for color image signals by the DSP 9. Finally, the processed digital signal is converted into image data by the image codec 47 and outputted to the host computer 60.

Figure 5:
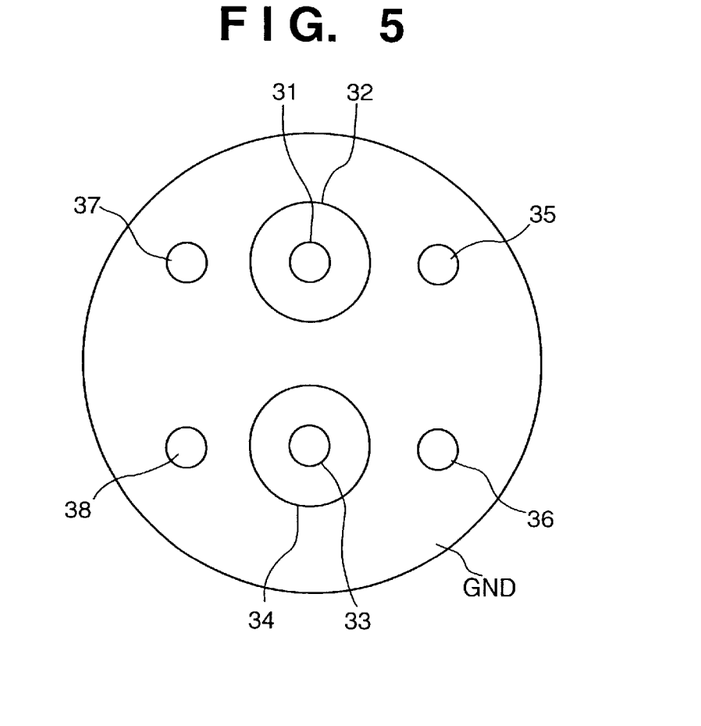
FIG. 5 is a cross sectional view showing a configuration of a composite cable to be used in the first and second embodiments of the present invention.

The camera head 1 and the CCU 3 on the expansion board are connected via the cable 2 (composite cable) using a Deutsche Industrie Normenausschuss (DIN) connector having eight pins. FIG. 5 show a cross sectional view of the composite cable. As shown in FIG. 5, it contains two coaxial cables, four single-wire cables, and a shielding cable for shielding these cables. With this configuration, the cable provides good shielding to the composite image signal (on which control signal is multiplexed) against noises.

Figure 6:
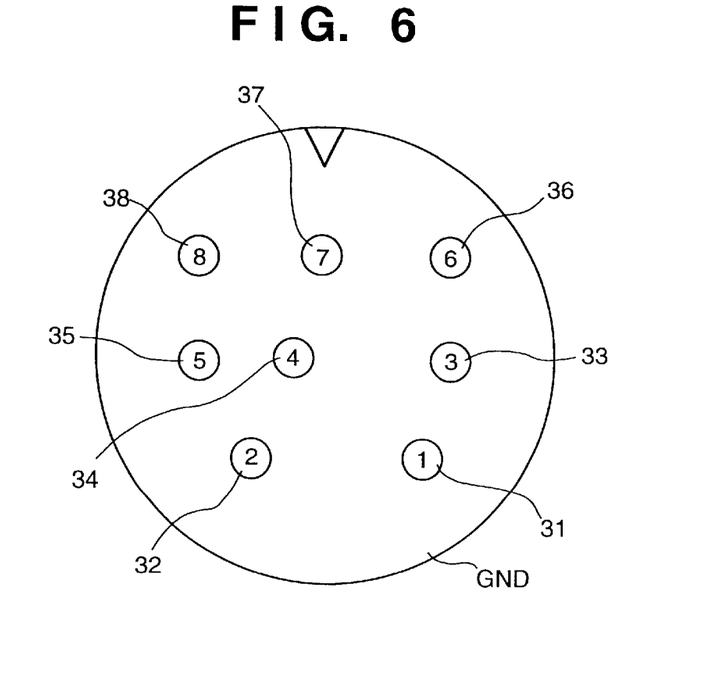
FIG. 6 is an explanatory view showing a pin arrangement of a connector according to the first and second embodiments of the present invention.

Further, FIG. 6 shows an example of a pin (terminal) arrangement of the DIN connector having eight pins. The DIN connectors are provided at both ends of the composite cables. Signals transmitted via the composite cable and the DIN connectors, provided at the both ends of the cable, having eight pins are explained in follow.

The first pin is to connect to the signal line 31 for transmitting a CCD signal on which a control signal is multiplexed during the vertical blanking period; the second pin is to connect to the line 32 (i.e., outer shell of the coaxial cable 31 and 32) for providing electric power of 9V; the third pin is to connect to a signal line 33 for transmitting the CLK signal; the fourth pin is to connect to the signal line 34 for providing electric power of 6.2V; the fifth pin is to connect to a signal line 35 for transmitting a SYNC signal; the sixth pin is to connect to the signal line 36 for providing the control signal from the CCU 3 on the expansion board to the camera head 1; the seventh pin is to connect to the signal line 37 for transmitting a right audio signal; and the eighth pin is to connect to the signal line 38 for transmitting a left audio signal.

As described above, the SYNC signal and the CCD signal on which control data is multiplexed during its vertical blanking period are transmitted from the camera head 1 to the CCU 3 on the expansion board 3 to establish synchronization between the camera head 1 and the CCU 3. Further, the CCU 3 on the expansion board outputs the CLK signal and the control data to the camera head 1.

In order to handle an image signal, i.e., a CCD signal, the CLK signal, and the HD signal, which require strict synchronization between the camera head 1 and the CCU 3, the length of the transmission cable is fixed at a length for which synchronization between the camera head 1 and the CCU 3 is established.

By configuring the image sensing system as described above, it is possible to omit two signal lines, i.e., a signal line for transmitting control data and a signal line for transmitting either the HD or VD signal. Furthermore, since the signal lines for audio signals are included in the composite signal line to which DIN connectors of eight pin are connected, the cable is simplified, thereby the manufacturing cost is reduced, furthermore, operability of the system is improved.

<Second Embodiment>

The second embodiment of the present invention will be explained below.

Figure 3:
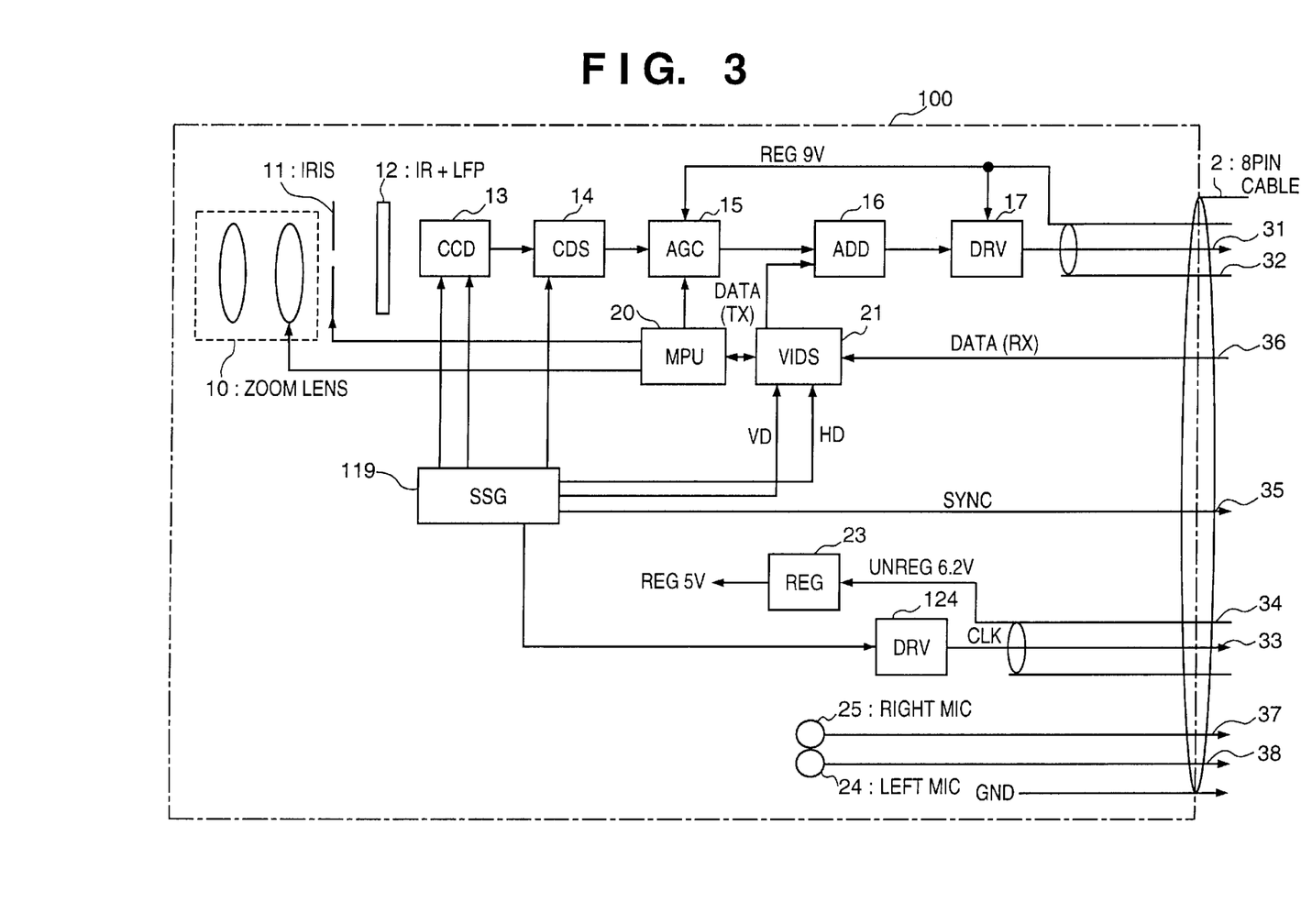
FIG. 3 is a block diagram illustrating a configuration of a camera head according to a second embodiment of the present invention.
Figure 4:
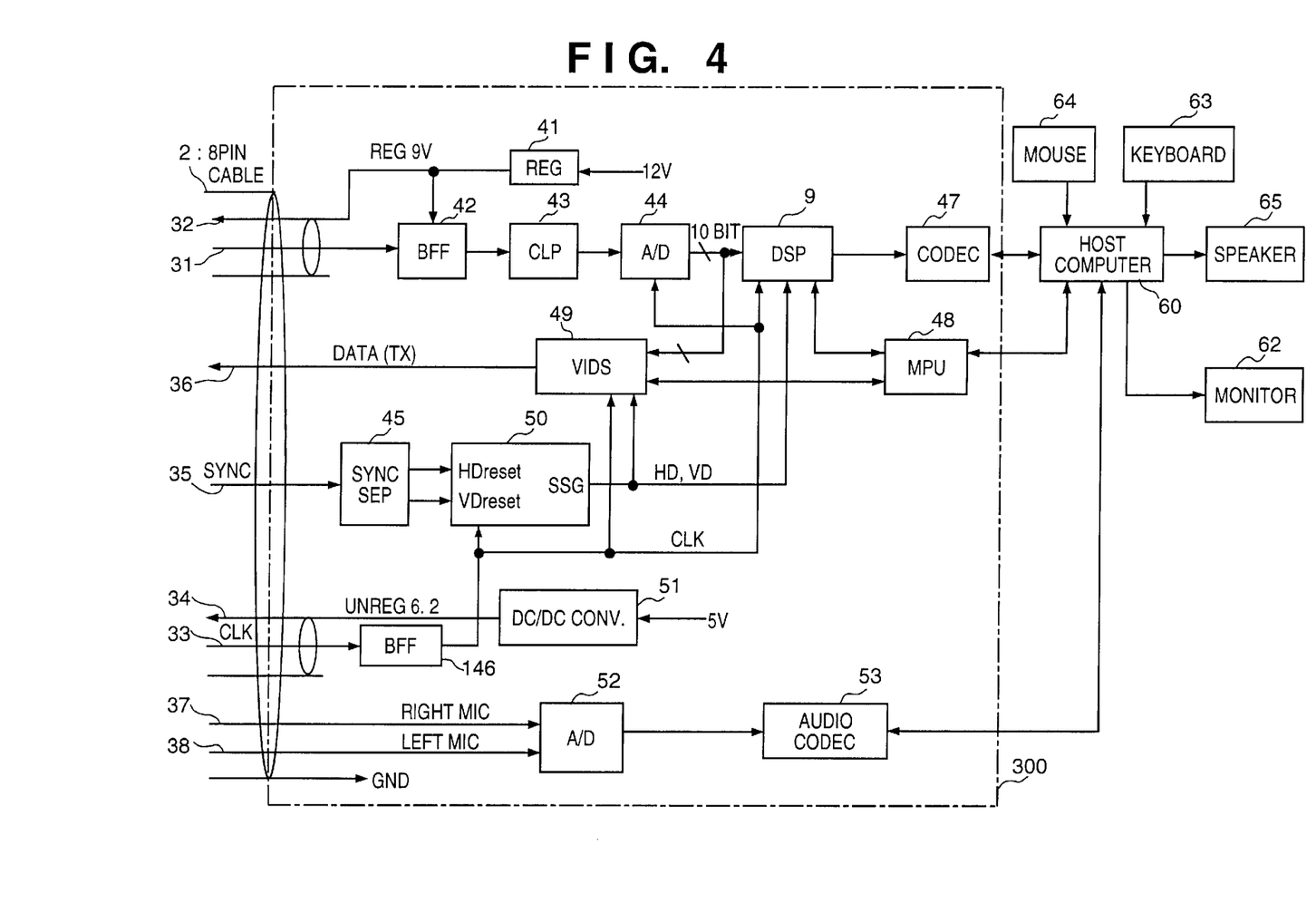
FIG. 4 is a block diagram illustrating a configuration of a camera control unit according to the second embodiment of the present invention.

FIG. 3 is a block diagram illustrating a configuration of a camera head 100 according to the second embodiment of the present invention, and FIG. 4 is a block diagram illustrating a configuration of a camera control unit (CCU) 300 according to the second embodiment of the present invention. In FIGS. 3 and 4, the same units and elements as those shown in FIGS. 1 and 2 are referred by the same reference numerals, and explanation of them is omitted.

In the second embodiment, a reference clock (CLK) signal is generated in the camera head 100, and transmitted to the CCU 300, which is different from the first embodiment. More specifically, the synchronizing signal generator (SSG) 119 generate the CLK signal, which is outputted via a driving circuit 124. The outputted CLK signal is received by a buffer circuit 146 of the CCU 300 and its waveform is shaped, thereafter, inputted to a synchronizing signal generator 150.

Other operation is the same as that explained in the first embodiment with reference to FIGS. 1 and 2, therefore, explanation of the operation is omitted.

As described above, according to the second embodiment, a SYNC signal, a CLK signal, and a CCD signal on which control data is multiplexed during the vertical blanking period are outputted from the camera head 100 to the CCU 300, and synchronization is established between them.

By configuring the camera head 100 and the CCU 300 as described above, since no signal delay due to the length of the cable occurs, inversion of color signals do not occur even when the length of the cable connecting between the camera head 100 and the CCU 300 is changed.

Further, similarly to the first embodiment, it is possible to omit two signal lines, i.e., a signal line for transmitting control data and a signal line for transmitting either the HD or VD signal comparing to the conventional example. Furthermore, since the signal lines for audio signals are included in the composite signal line to which DIN connectors having eight pin are connected, the cable is simplified, cost for manufacturing the cable is reduced, furthermore, operability of the system is improved.

The present invention is not limited to the above embodiments and various changes and modifications can be made within the spirit and scope of the present invention. Therefore to appraise the public of the scope of the present invention, the following claims are made.

What is claimed is:

1. An image sensing system that includes:
   an image sensing apparatus comprising:
      image sensing means for sensing an object and outputting an image signal;
      first input means for inputting a reference pixel clock signal from an image processing apparatus;
      first synchronizing signal generation means for generating a plurality of synchronizing signals on the basis of the reference pixel clock signal input from the image processing apparatus and generating a composite synchronizing signal by multiplexing the generated synchronizing signals;
      first output means for outputting the composite synchronizing signal generated by said first synchronizing signal generation means to the image processing apparatus;
      time-divisional multiplexing means for multiplexing first control data on the image signal in a time-division manner on the basis of the synchronizing signals generated by said first synchronizing signal generation means;
      second output means for outputting the image signal and the first control data which are multiplexed in the time-division manner by said time-divisional multiplexing means to the image processing apparatus; and
      second input means for inputting second control data from the image processing apparatus;
   the image processing apparatus comprising:
      third input means for inputting the composite synchronizing signal from the image sensing apparatus;
      second synchronizing signal generation means for separating the composite synchronizing signal inputted by said third input means into a plurality of synchronizing signals and outputting the synchronizing signals;
      third output means for outputting the second control data to the image sensing apparatus on the basis of the plurality of synchronizing signals generated by said second synchronizing signal generation means;
      clock signal generation means for generating the reference pixel clock signal;

fourth output means for outputting the clock signal generated by said clock signal generation means to the image sensing apparatus;

fourth input means for inputting the image signal on which the first control data is multiplexed from the image sensing apparatus;

a cable for connecting between the image sensing apparatus and the image processing apparatus;

wherein said cable connects said first input means, said second input means, said first output means and said second output means of the image sensing apparatus to said fourth output means, said third output means, said third input means and said fourth input means of the image processing apparatus, respectively;

wherein the image sensing apparatus further comprises first connecting means for connecting said first input means, said second input means, said first output means, and said second output means to the cable, and the image processing apparatus further comprises second connecting means for connecting said third output means, said fourth output means, said third input means, and said fourth input means to the cable, and said cable comprises third and fourth connecting means for connecting to said first and second connecting means; and, said cable including two coaxial cables, four signal lines, and a shielding cable, all of which are integrally configured, and each of a first to fourth connecting means having eight terminal pins and a shielding shell.

2. The image sensing system according to claim 1, wherein said time-divisional multiplexing means multiplexes the first control data on the image signal during the vertical blanking period of the image signal.

3. The image sensing system according to claim 2, wherein said time-divisional multiplexing means has adding means for adding the image signal and the first control data and vertical interval data signal (VIDS) processing means for inputting the first control data into the adding means during the vertical blanking period of the image signal.

4. The image sensing system according to claim 1, wherein the image sensing apparatus further comprises first control means for controlling each unit of the image sensing apparatus on the basis of the second control data inputted via the second input means and generating the first control data.

5. The image sensing system according to claim 1, wherein the third output means outputs the second control data during a vertical blanking period.

6. The image sensing system according to claim 5, wherein said third output means is vertical interval data signal (VIDS) processing means.

7. The image sensing system according to claim 1, wherein the image processing apparatus further comprises separation means for separating the first control data from the image signal inputted by said fourth input means and second control means for generating the second control data on the basis of the first control data separated by said separation means.

8. The image sensing system according to claim 1, wherein the image sensing apparatus further comprises:

audio input means for converting sound into an electric audio signal and outputting the electric audio signal; and fifth output means for outputting the electric audio signal outputted from said audio input means to the image processing apparatus, and the image processing apparatus further comprises:

fifth input means for inputting the electric audio signal from the image sensing apparatus; and audio signal processing means for processing the electric audio signal and outputting it, wherein said cable connects between said fifth output means and said fifth input means.

9. The image sensing system according to claim 8, wherein said audio input means is configured with first and second microphones, said fifth output means has two output means corresponding to the respective first and second microphones, and said fifth input means has first and second audio signal input means for inputting first and second audio signals.

10. The image sensing system according to claim 1, wherein the image sensing apparatus further comprises electric power input means for receiving electric power from the image processing apparatus and said image processing apparatus further comprises electric power output means for supplying electric power to the image sensing apparatus, wherein said cable connects said electric power input means and said electric power output means.

11. An image sensing system that includes:

an image sensing apparatus comprising:

image sensing means for sensing an object and outputting an image signal;

clock signal generation means for generating a reference pixel clock signal;

first output means for outputting the clock signal generated by said clock signal generation means to an image processing apparatus;

first synchronizing signal generation means for generating a plurality of synchronizing signals on the basis of the reference pixel clock signal generated by said clock signal generation means and generating a composite synchronizing signal by multiplexing the generated synchronizing signals;

second output means for outputting the composite synchronizing signal generated by said first synchronizing signal generation means to the image processing apparatus;

time-divisional multiplexing means for multiplexing first control data on the image signal in a time-division manner on the basis of the synchronizing signals generated by said first synchronizing signal generation means;

third output means for outputting the image signal and the first control data which are multiplexed in the time-division manner by said time-divisional multiplexing means to the image processing apparatus;

first input means for inputting second control data from the image processing apparatus;

the image processing apparatus comprising:

second input means for inputting the composite synchronizing signal from the image sensing apparatus;

second synchronizing signal generation means for separating the composite synchronizing signal inputted by said second input means into a plurality of synchronizing signals and outputting the synchronizing signals;

fourth output means for outputting the second control data to the image sensing apparatus on the basis of the plurality of synchronizing signals generated by said second synchronizing signal generation means;

third input means for inputting the reference pixel clock signal from the image sensing apparatus;

fourth input means for inputting the image signal on which the first control data is multiplexed from the image sensing apparatus; and a cable for connecting between the image sensing apparatus and the image processing apparatus, wherein said cable connects said first input means, said first output means, said second output means and said third output means of the image sensing apparatus to said fourth output means, said third input means, said second input means and said fourth input means of the image processing apparatus, respectively;

wherein the image sensing apparatus further comprises first connecting means for connecting said first input means, said first output means, said second output means, and said third output means to the cable, and the image processing apparatus further comprises second connecting means for connecting said fourth output means, said second input means, said third input means, and said fourth input means for the cable, and said cable comprises third and fourth connecting means for connecting to said first and second connecting means;

wherein said cable includes two coaxial cables, four signal lines, and a shielding cable, all of which are integrally configured, and each of a first to fourth connecting means has eight terminal pins and a shielding shell.

12. The image sensing system according to claim 11, wherein said time-divisional multiplexing means multiplexes the first control data on the image signal during the vertical blanking period of the image signal.

13. The image sensing system according to claim 12, wherein said time-divisional multiplexing means has adding means for adding the image signal and the first control data and vertical interval data signal (VIDS) processing means for inputting the first control data into the adding means during the vertical blanking period of the image signal.

14. The image sensing system according to claim 11, wherein the image sensing apparatus further comprises first control means for controlling each unit of the image sensing apparatus on the basis of the second control data inputted via the first input means and generating the first control data.

15. The image sensing system according to claim 11, wherein said fourth output means outputs the second control data during a vertical blanking period.

16. The image sensing system according to claim 15, wherein said fourth output means is vertical interval data signal (VIDS) processing means.

17. The image sensing system according to claim 11, wherein the image sensing apparatus further comprises separation means for separating the first control data from the image signal inputted by said fourth input means and second control means for generating the second control data on the basis of the first control data separated by said separation means.

18. The image sensing system according to claim 11, the image sensing apparatus further comprises: audio input means for converting sound into an electric audio signal and outputting the electric audio signal; and fifth output means for outputting the electric audio signal outputted from said audio input means to the image processing apparatus, and the image processing apparatus further comprises: fifth input means for inputting the electric audio signal from the image sensing apparatus; and audio signal processing means for processing the electric audio signal and outputting it, wherein said cable connects between fifth output means and said fifth input means.

19. The image sensing system according to claim 18, wherein said audio input means is configured with first and second microphones, said fifth output means has two output means corresponding to the respective first and second microphones, and said fifth input means has first and second audio signal input means for inputting first and second audio signals.

20. The image sensing system according to claim 11, wherein said image sensing apparatus further comprises electric power input means for receiving electric power from the image processing apparatus and said image processing apparatus further comprises electric power output means for supplying electric power to the image sensing apparatus, wherein said cable connects said electric power input means and said electric power output means.

* * * * *

UNITED STATES PATENT AND TRADEMARK OFFICE
CERTIFICATE OF CORRECTION

PATENT NO. : 6,392,698 B1
DATED : May 21, 2002
INVENTOR(S) : Toshihiko Yokoyama

It is certified that error appears in the above-identified patent and that said Letters Patent is hereby corrected as shown below:

Column 1,
Line 50, "necessary operating" should read -- necessary for operating --

Column 3,
Line 13, "signal means" should read -- signal generation means --

Column 5,
Line 28, "illustrating a of" should read -- illustrating a configuration of --

Signed and Sealed this

Twenty-ninth Day of October, 2002

Attest:

Attesting Officer

JAMES E. ROGAN
Director of the United States Patent and Trademark Office